United States Patent [19]
Hasegawa et al.

[11] Patent Number: 5,191,431
[45] Date of Patent: Mar. 2, 1993

[54] RECORDING APPARATUS HAVING PLURAL OPERATING MODES INVOLVING DIVERSE SIGNAL COMPRESSION RATES AND DIFFERENT APPORTIONING OF PILOT SIGNAL RECORDING AREA

[75] Inventors: Masahide Hasegawa, Kanagawa; Yasuyuki Tanaka, Tokyo, both of Japan

[73] Assignee: Canon Kabushiki Kaisha, Tokyo, Japan

[21] Appl. No.: 566,628

[22] Filed: Aug. 13, 1990

[30] Foreign Application Priority Data

Aug. 29, 1989 [JP] Japan .................. 1-220333
Aug. 31, 1989 [JP] Japan .................. 1-225137
Oct. 12, 1989 [JP] Japan .................. 1-263837

[51] Int. Cl.$^5$ .............................. H04N 5/76
[52] U.S. Cl. ........................... 358/323; 358/335; 360/33.1; 360/27
[58] Field of Search ............. 358/335, 133, 135, 136, 358/323; 360/9.1, 33.1, 27, 32, 10.2

[56] References Cited

U.S. PATENT DOCUMENTS

| | | | |
|---|---|---|---|
| 4,675,750 | 6/1987 | Collins et al. | 360/9.1 |
| 4,823,206 | 4/1989 | Nemoto et al. | 360/33.1 |
| 4,989,102 | 1/1991 | Murabayshi et al. | 360/27 |
| 5,081,550 | 1/1992 | Yagisawa et al. | 360/78.02 |

*Primary Examiner*—Tommy P. Chin
*Assistant Examiner*—Huy Nguyen
*Attorney, Agent, or Firm*—Robin, Blecker, Daley & Driscoll

[57] ABSTRACT

An information recording apparatus comprises a signal compression unit responsive to a mode changeover signal for changing over the compression rate of input digital information between first and second compression rates, the second compression rate being higher than said first compression rate, a unit for generating a tracking-control pilot signal, a recording unit for recording the digital information compressed by said compressing unit and the pilot signal on a recording medium while forming a number of recording tracks, and a mode changeover unit for generating the mode changeover signal for changing over an operating mode of the apparatus between a plurality of modes, the plurality of modes including: a first mode in which the compressing unit compresses the digital information at the first compression rate and the recording unit sets the proportion of a recording area of the pilot signal to the entirety of the recording track to a first ration; and a second mode in which the compressing unit compresses the digital information at the second compression rate and the recording unit sets the proportion of a recording area of the pilot signal to the entirety of the recording track to a second ratio, the second ratio being higher than the first ratio.

15 Claims, 3 Drawing Sheets

RECORDING APPARATUS HAVING PLURAL OPERATING MODES INVOLVING DIVERSE SIGNAL COMPRESSION RATES AND DIFFERENT APPORTIONING OF PILOT SIGNAL RECORDING AREA

BACKGROUND OF THE INVENTION

1. Field of the Invention

This invention relates to recording apparatuses and, more particularly, to a recording apparatus for recording a tracking-control pilot signal and an information signal in a time-divisionally multiplexed manner.

2. Description of the Related Art

As one of the information recording apparatuses of this kind, there been known a digital type magnetic recording apparatus.

To allow tracking of the rotary head to be carried out at the time of reproduction, the prior known digital type magnetic recording and reproducing apparatus employs one of the following exemplary methods:

(i) A tracking-control pilot signal is recorded in an area provided in a portion on each helical track in a time-divisionally multiplexed manner with an information signal (the area division pilot method) as is used in a DAT (Digital Audio Tape recorder);

(ii) A tracking-control pilot signal of low frequency is recorded in a frequency-multiplexed manner (the frequency multiplex pilot method) as is adopted in an 8 mm VTR; and (iii) The head is made to oscillate by using a movable element such as a dimorph and this oscillation brings out change of the reproduced envelope, from which the tracking-control state is detected (the dither method).

The above-described conventional methods on consideration of affording an improvement of the record density, have, however, the following drawbacks:

(i) In the so-called area division pilot method used in the DAT (Digital Audio Tape recorder), etc., because part of the track is occupied only by the pilot signal, the redundancy of information as a whole increases. Also, because what is permitted for use in detecting the tracking state is limited to only that part of the track, there is another drawback in that the curvature of the track cannot be detected.

(ii) In the frequency multiplex pilot method used in the 8 mm VTR, it is not only difficult to enhance the SN ratio of the pilot signal but the method also increases the error rate of digital information because the extra signal of the low frequency is multiplexed with the information signal. Also, a modulation method that suppresses the low-frequency component has, therefore, to be employed in combination with a filter for the separation processing. Hence, there is a drawback in that the modulation method of large redundancy such as the frequency-modulation method or the so-called 8-10 conversion processing means must be adopted.

(iii) In the so-called dither method that oscillates the head, the introduction of the variation of the envelope causes the reproduced output to decrease. Another drawback is that the reproduced signal suffers waveform distortion and jitter resulting from the amplitude variation.

SUMMARY OF THE INVENTION

An object of the invention is to eliminate the above-described problems.

Another object of the invention is to provide a information signal recording apparatus employing the method of time-divisionally multiplexing a tracking-control pilot signal with an information signal without causing the information signal to deteriorate, while still maintaining a possibility of providing good tracking control.

Under such objects, according to the invention, in an embodiment thereof, an information recording apparatus is proposed, comprising compressing means for compressing digital information, the compressing means being capable of changing over the compression rate of the digital information, generating means for generating a tracking-control pilot signal, recording means for recording the digital information compressed by the compressing means and the pilot signal on a recording medium while forming a number of recording tracks, and mode changeover means for changing over the operating mode of the apparatus between a plurality of modes including a first mode in which the compressing means compresses the digital information at a first compression rate and the recording means sets the proportion of a recording area of the pilot signal to the entirety of the recording track to a first rate and a second mode in which the compressing means compresses the digital information at a second compression rate higher than the first compression rate and the recording means sets the proportion of a recording area of the pilot signal to the entirety of the recording track to a second rate which is higher than the first rate.

Other objects of the invention and its features will become apparent from the following detailed descriptions of embodiments thereof by reference to the drawings:

DETAILED DESCRIPTION OF THE PREFERRED EMBODIMENTS

The present invention is next described in detail in connection with embodiments thereof by reference to the drawings.

Figure 1:
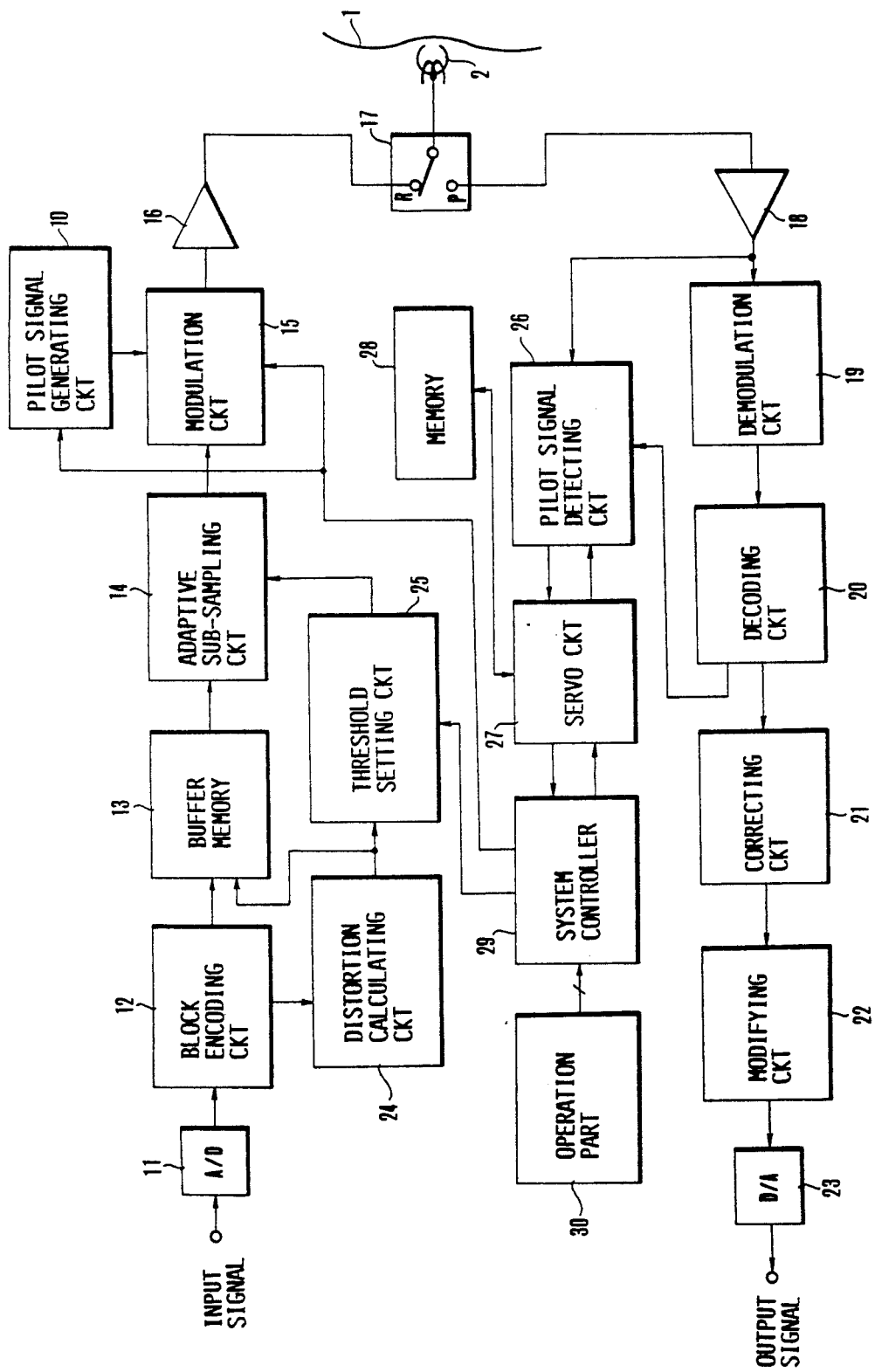
FIG. 1 is a block diagram illustrating the construction of the main parts of an embodiment of a recording and reproducing apparatus according to the invention.

FIG. 1 in block diagram shows the construction of a digital VTR embodying one form of the invention.

The input signal in the present embodiment will be described by taking the high-definition video signal made of 1125 scanning lines with a frame frequency of 30 Hz, but it may, of course, be NTSC or other types of video signals, or audio signal, or combinations of these signals, provided that for these other types of video signals, the numerical data to be described below should be changed to suitable ones, when the present invention is applied to them.

The input signal is first supplied to an A/D conversion circuit 11 where it is converted into a digital signal. With respect to the input signal, assuming that the sampling frequency of the luminance signal Y is 48.6 MHz, that of the color-difference signals $P_R$ and $P_B$ is 16.2 MHz, and quantization is performed by 8 bits, then the quantity of information obtained by the A/D conversion circuit 11 is 648 MBPS.

The output signal of the A/D conversion circuit 11, except for the horizontal and vertical blanking periods, i.e., the signal representing the effective picture elements, is subjected to block encoding in a block encoding circuit 12. As the encoding method, mention may be made of the Hadamard's transformation or like transformation encoding, predictive encoding and many other methods. In the present embodiment, 8×8 picture elements are taken as a block. For the data of the 64 picture elements in the block, the minimum and maximum values each are expressed by 8 bits, while, as the values between the maximum and minimum values are grouped to 15 partitions (4 bits), data of each picture element is encoded in 4-bit form. These data are written in a buffer memory 13. Up to here, the quantity of information is compressed to about ½.

Meanwhile, from these 4-bit data, a distortion calculating circuit 24 extracts only the 4-bit data corresponding to ¼ of all the picture elements. By using only these extracted data, the 4-bit data for all the picture elements are then restored. These restored data are then compared with the original data. Their differences represent the condensation and rarefaction of the picture. Thus, the amount of distortion is calculated. The data representing the aforesaid amount of distortion for every block are then combined with the aforesaid data output from the block encoding circuit 12, so that they are written in the buffer memory 13. The data representing the aforesaid amount of distortion are supplied also to a threshold setting circuit 25 which is controlled by a system controller 29. Here, with respect to the data representing the amount of distortion for every block, a histogram is formed in units of one frame. In more detail, when one frame of input signal is written in the buffer memory 13, the threshold setting circuit 25 completes the aforesaid histogram of the distortion and sets a threshold value so that in this histogram, some blocks of large distortion that account for 1/5 of all the blocks of one frame are encoded with the compression being left unchanged from ½, while the other blocks are encoded with a further compression of ¼ (up to ⅛ compression), thus giving an average value of 1/5 in the compression rate.

An adaptive sub-sampling circuit 14 performs the adaptive sub-sampling in such a manner that, as the threshold value output from the threshold setting circuit 25 is compared with the amount of distortion of every block output from the buffer memory 13, the data being read out in sequence from the buffer memory 13 are sub-sampled at ¼ for blocks having lower distortion values than the threshold value, and circuit 14 produces an output in the form of a compressed-to-1/5 signal, which is then supplied to a modulation circuit 15 under control of the system controller 29. In the modulation circuit 15, the 1/5 compressed signal is subjected to other processing such as addition of an error correction code, low-band suppression modulation for magnetic recording and shuffling, and these items of digital information are time-divisionally multiplexed with a tracking-control pilot signal output from a pilot signal generating circuit 10. This time-divisionally multiplexed signal is supplied through a recording amplifier 16 and a recording side terminal (R) of a recording and reproduction changeover switch 17 to a rotary head 2 by which it is recorded on a tape 1. Here, the effective picture elements are 82%; the quantity of information occupied by the minimum value and the maximum value accounts for 2/64 of the quantity of information obtained in the case where the effective picture elements are not all compressed; the quantity of information occupied by all the difference values accounts for 1/5; the redundancy addition by the modulation is 13%. Accordingly, the resultant quantity of information becomes $648 \times 0.82 \times (2/64 + 1/5) \times 1.13 \approx 139$ (MBPS).

Figure 2:
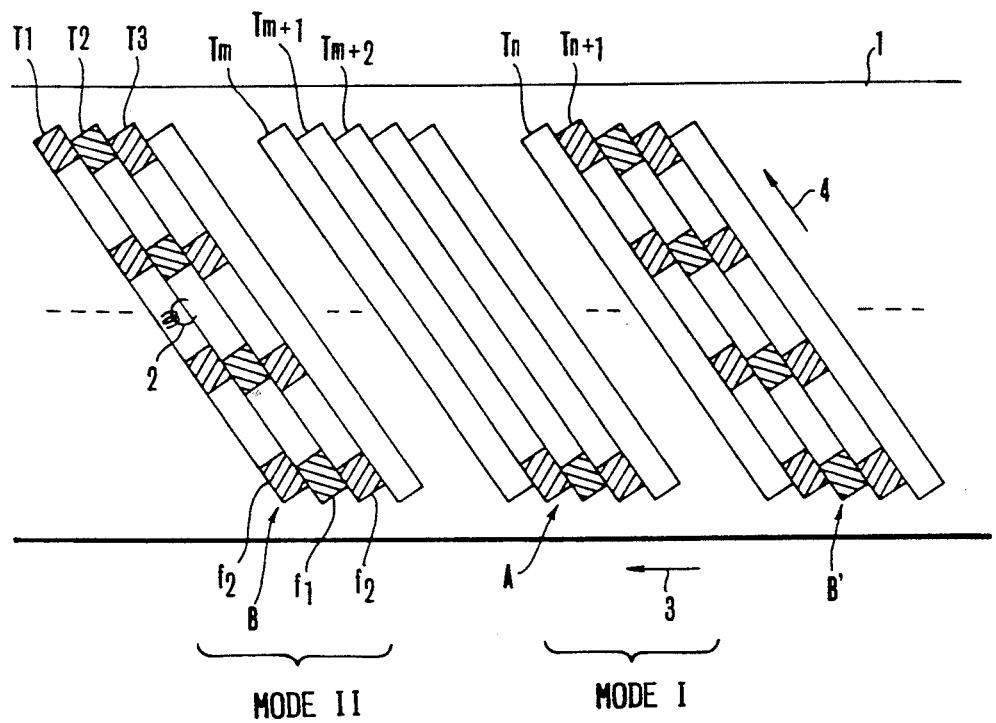
FIG. 2 is a plan view illustrating the track patterns recorded on a tape by the apparatus of FIG. 1.

Suppose this signal is recorded in three channels by winding the tape 1 180° around the rotary head 2 which has a rotation diameter of 62 mm and rotates at 3,600 r.p.m., then the recording wavelength is about 0.5 $\mu$m. Thus, one frame corresponds to twelve tracks (m=12), and one second corresponds to 360 tracks (n=360). Now, as shown in FIG. 2, with regard to the frames whose recording data are compressed to 1/5 as a whole as has been described above, in one place for one frame, a pilot area in a ratio of 1/165 of the length of one track is provided in each of adjoining three tracks (shown by A in the figure). Also, for every one frame a second, i.e., for every 360 tracks, in three adjoining tracks, a like pilot area is provided as arranged at four locations in the same track, thus forming track patterns as shown by B and B' in the figure. In FIG. 2, reference numeral 1 denotes the tape, and reference numeral 2 denotes the head. The tracks are labeled $T_1 - T_{n+1}$. A pilot signal of a first frequency $f_1$ and another pilot signal of a second frequency $f_2$ are recorded in respective areas of hatching of opposite inclination. About the tracking by using such pilot signals $f_1$ and $f_2$, explanation is made in U.S. patent application Ser. No. 405,558 filed on Sep. 11, 1989. So, this is not discussed here.

In the case of one place of the pilot areas of a frame, the proportion of blocks of ½ compression is 20% and the compression rate as a whole is 1/5, as has been described before. In a frame with one track including four pilot areas (this track repeats itself 3 times) as occurring once a second, therefore, the proportion of blocks of ½ compression is altered to 19.7%, and four pilot areas a track are afforded once a second for that time. This is the spirit of the present invention. In the present embodiment, this is realized by changing the threshold value of the threshold setting circuit 25. In more detail, a mode in which what account for 1/5 of 160×130=20800 blocks, say 4160 blocks, are taken to ½ compression and another mode in which what account for 19.7%, say 4096 blocks, are taken to ½ compression are changed over in a period of 1 second by the command from the system controller 29 when the threshold value is set in the threshold setting circuit 25. Also, the system controller 29 controls a modulation circuit 15 and the pilot signal generating circuit 10 in accordance with the aforesaid modes, thus controlling the timing of multiplex of the pilot signal.

At the time of reproduction, the reproduced signal from the head 2 is amplified by an amplifier 18, then demodulated into a digital signal in a demodulation circuit 19, then decoded by a decoding circuit 20 to obtain a signal of 648 MBPS. Having passed through a correcting circuit 21 and a modifying circuit 22, it is output as an analog signal by a D/A conversion circuit 23. Here, for tracking purposes, the output of the reproduction amplifier 18 is supplied also to a pilot signal detecting circuit 26, where a detecting operation is carried out by a signal representing the detection of the pilot area from the decoding circuit 20 and a timing signal from a servo circuit 27, and the detection signal is output as a tracking error signal, which is then supplied to the servo circuit 27. By this tracking error signal, the servo circuit 27 controls the tape running speed. Also, that servo circuit 27 carries out such a tracking operation that an error signal waveform representing the track curvature obtained on the basis of the reproduced pilot signal by that head which reproduces the central one of the three tracks provided each with four pilot areas once a second is stored in a memory 28, and with reference to this stored data, a compensation is applied to the tracking error signal obtained on the basis of the reproduced pilot signal by that head which reproduces the central track of the three tracks provided each with one pilot area once a frame, whereby the average output over the entire track length is made maximum. In a case where the head 2 is provided with a movable element such as a dimorph, it is also possible for the head 2 to follow the track curvature.

Usually, for the tracking servo by the tape transportation, a responsiveness of several Hz is sufficient. So, a frequency of several tens of Hz suffices for sampling error signals. Also, for the track curvature, because a swell of 1-2 peaks constitutes the main component, information obtained about a few locations in one track is sufficient. To prevent a faulty operation from occurring, a method of averaging the curvature data over a few cycles may be used.

Though the foregoing embodiment has been described on an example of combination of the encoding method using the minimum value and the maximum value and the sub-sampling, it is needless to say that the invention is applicable even to any other types of compression, provided the compression rate is changed over between values suited to the type used.

Also, as to the numerical values cited in the above-described embodiment, suited ones to the given system may be set. So, it is to be understood that the invention does not confine them. For example, "n" has been defined as a multiple of "m". This only means that, if so, discriminating is rather easy in reproduction. Hence, there is no need to always rely on the multiple.

As has been described above, according to the foregoing embodiment, in the digital magnetic recording apparatus of the adaptive compression type, the compression rate of the recording data is changed over so as to arrange a track for providing a plurality of pilot areas in one track by every predetermined number of tracks, whereby despite a simple form, detection of a track curvature is made possible without involving almost any increase of deterioration of the signal, and a tracking operation that allows a maximum reproduced output to be obtained without increasing the redundancy becomes possible. Therefore, the recording density can be increased, and the fidelity and compatibility of the apparatus can be improved.

Figure 3:
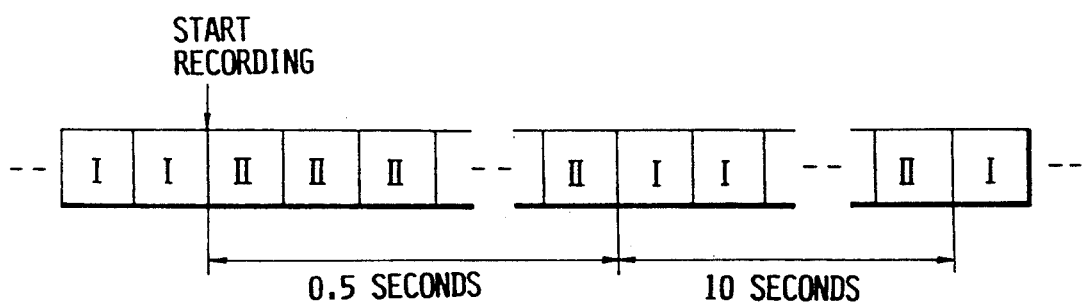
FIG. 3 is a schematic diagram to explain another manner in which the apparatus of FIG. 1 operates.

Next, another example of operation in the embodiment of FIG. 1 is described by using FIG. 3.

Here, an event of providing one pilot area in each of three tracks included in one frame (12 tracks) as has been described above, is called a "mode I".

Also, an event of providing four pilot areas in each of the three tracks included in one frame (12 tracks), is called a "mode II".

FIG. 3 is a chart to explain the timing in which the apparatus is changed over between the mode I and the mode II. In an example shown in the same figure, frames of the mode II that have some possibility for the image quality of slightly dropping are concentrically arranged just after the start of recording and, after that, are made to seldom appear. In other words, as shown in FIG. 3, for a time of 0.5 seconds=15 frames beginning with the start of recording, the mode II is continuously operated. After that, the mode II is introduced once in a period of 10 seconds=300 frames. The changeover of the modes is performed by the system controller 29 in response to operation of an operation part 30. By this, increasing of the redundancy is made very small.

In particular, the point of start of recording is also the point of scene change. Therefore, some dropping of the picture quality hardly attracts viewer's attention. Also, because the probability of it being the point of start of reproducing is high, if the mode II is later inserted at a very small rate, there is no problem on actual practice of detecting the track curvature. Also, since there are many pilot areas in continuity, it is possible to utilize them in a head search operation.

It should be noted that in the example shown in FIG. 3, except for the time of joining records by pose, each time the recording starts, an operation of switching to and maintaining the mode II for a time of 0.5 seconds is carried out. But, it is also possible to use such a form that, each time records are joined, the mode II is operated for the time of 0.5 seconds.

Referring again to FIG. 2, the corresponding relationship with FIG. 3 is explained.

The start point of recording shown in FIG. 3 is taken at a track $T_1$, and the first occurrence of the mode I after the lapse of 0.5 seconds is assumed to begin with a track $T_{m+1}$. Assuming again that, in more 10seconds, the mode II begins with a track $T_{n+1}$, then these variables m and n take the following values:

$m = 12$ (tracks/frame)$\times 30$ (frames/second)$\times 0.5$ (seconds)$= 180$ $n = m + 12$ (tracks/frame)$\times 30$ (frames/second)$\times 10$ (seconds)$- 12$ (tracks)$= 3768$ After this, the tracks of the mode II are provided with three tracks every 10 seconds, while the other tracks all are of the mode I.

As has been described above, in the present embodiment, in order to change over between a recording mode in which a plurality of pilot areas are inserted into one track and another recording mode in which only one pilot area is inserted into one track, the rate of compression of data is changed. Moreover, by changing the ratio of mixture of the two recording modes between just after the start of recording and later, it is made possible, despite a simple form, that while the deterioration of the signal is made not noticeable, and the increase of the redundancy is suppressed to a minimum, the track curvature is detected, and a tracking control that affords a maximum reproduction output is made. Also, these pilot areas can be utilized as a head search signal. Thus, it becomes possible to increase the recording density and to improve the fidelity and compatibility of the apparatus.

Figure 4:
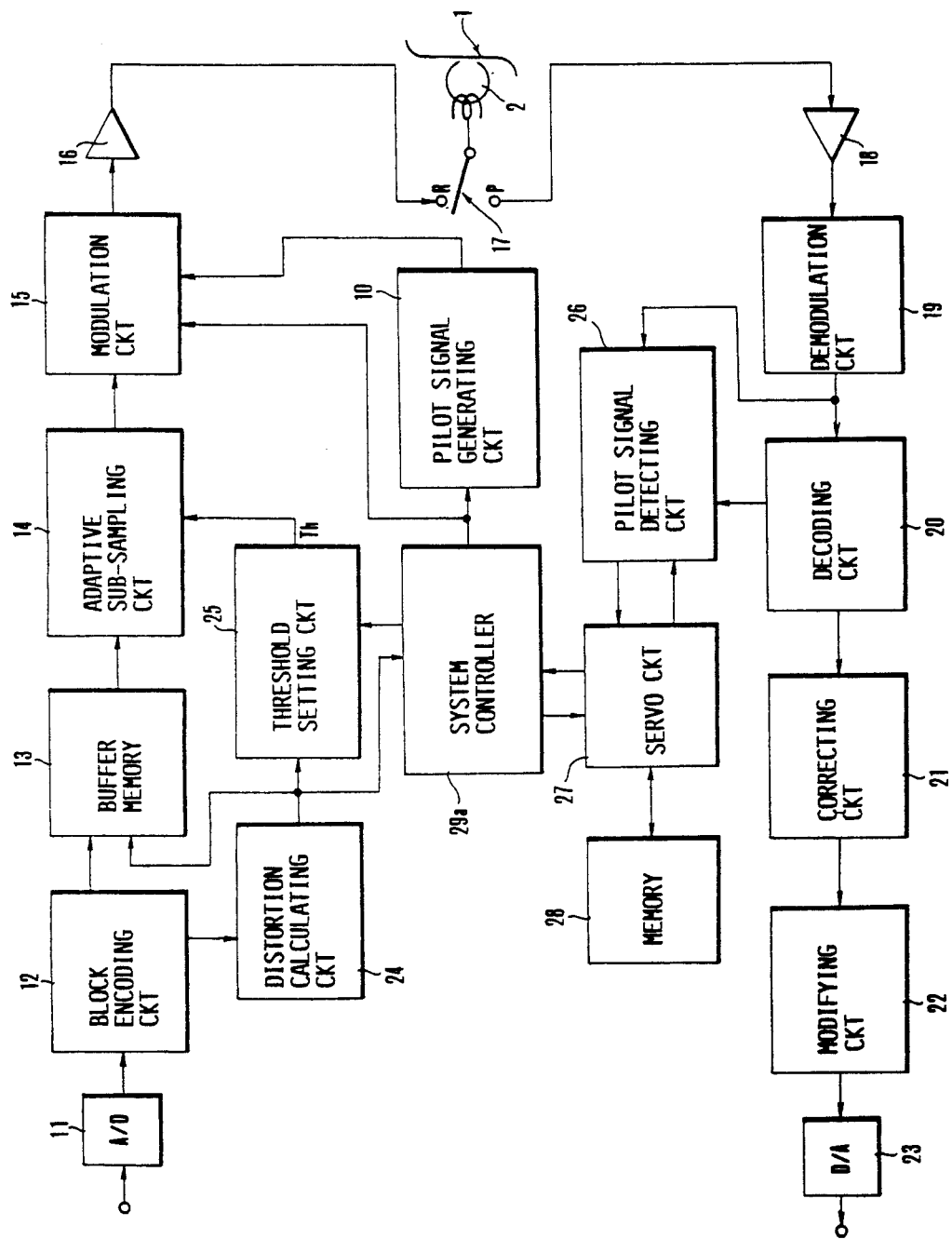
FIG. 4 is a block diagram illustrating the construction of the main parts of another embodiment of the recording and reproducing apparatus according to the invention.

FIG. 4 is a diagram illustrating the construction of the main parts of a digital VTR embodying another form of the present invention, where the constituent elements similar to those of the embodiment of FIG. 1 are denoted by the same reference numerals and their explanation is omitted.

While, in the foregoing embodiment, selection of one of the mode I and the mode II is performed either for every cycle of a predetermined period, or in response to an operation (recording start command) of the operation part 30 by the system controller 29, in the present embodiment a system controller 29a monitors the amount of distortion of each block calculated by the distortion calculating circuit 24 in units of one picture, and, for each picture, whether it is to be recorded by the mode I or by the mode II is determined depending on the magnitude of distortion over the entire area of that picture. In a specific example, whether or not the amount of distortion of each block is above a predetermined value is judged. For a picture with a large number of blocks the amount of distortion of which is above the predetermined value, the mode I is selected. For a picture with a small number, the mode II is selected.

That is, on completion of the distortion histogram, for the picture of the mode I, the threshold setting circuit 25 sets such a threshold value Th that in the order of large distortions, 1/5 of the blocks are left in $\frac{1}{2}$ compression, and the remaining blocks which account for 4/5 are further compressed to $\frac{1}{4}$. This gives an overall compression rate: $(1/5) \times (\frac{1}{2}) + (4/5) \times (\frac{1}{4}) = 20\%$. For the picture of the mode II, in order to reduce the amount of data, for example, such a threshold value Th is set that, in the order of large distortions, 19.7% of the blocks are left in $\frac{1}{2}$ compression, and the remaining blocks of 80.3% are further compressed to $\frac{1}{4}$. By this, the overall compression rate becomes $0.197 \times (\frac{1}{2}) + 0.803 \times (\frac{1}{4}) = 19.89\%$.

As will be easily understood from the foregoing description, according to the embodiment of FIG. 4, a large compression is performed in that part of the signal which does not much deteriorate even at a high compression rate, and the tracking-control pilot signal is inserted into the saved vacant area. Therefore, the curvature of a track can be detected almost without deteriorating the signal. Also, it becomes possible to perform the tracking operation which allows a maximum reproduced output to be obtained without increasing the redundancy. These produce advantages that the recording density can be increased and the fidelity and compatibility of the apparatus can be improved.

What is claimed is:

1. An information recording apparatus comprising:
   (a) compressing means for compressing digital information, said compressing means being responsive to a mode changeover signal for changing over the compression rate of the digital information between at least first and second compression rates, said second compression rate being higher than said first compression rate;
   (b) generating means for generating a tracking-control pilot signal;
   (c) recording means for recording the digital information compressed by said compressing means and the pilot signal on a recording medium while forming a number of recording tracks; and
   (d) mode changeover means for generating said mode changeover signal for changing over an operating mode of said apparatus between a plurality of modes, said plurality of modes including: a first mode in which said compressing means compresses the digital information at said first compression rate and said recording means sets the proportion of a recording area of the pilot signal to the entirety of the recording track to a first ratio; and a second mode in which said compressing means compresses the digital information at said second compression rate and said recording means sets the proportion of a recording area of the pilot signal to the entirety of the recording track to a second ratio, said second ratio being higher than the first ratio.

2. An apparatus according to claim 1, wherein said mode changeover means changes over said operating mode of said apparatus between said first mode and said second mode in a predetermined period.

3. An apparatus according to claim 1, wherein said mode changeover means sets said apparatus in said second mode for a predetermined time just after said recording means starts recording.

4. An apparatus according to claim 3, wherein said mode changeover means changes over said operating mode of said apparatus between said first mode and said second mode in a predetermined period for a time other than the predetermined time just after said recording means starts recording.

5. An apparatus according to claim 1, wherein said mode changeover means changes the operating mode of said apparatus on the basis of characteristics of said digital information.

6. An apparatus according to claim 5, wherein said digital information is a digital video signal, and wherein said mode changeover means includes distortion calculating means for discriminating between low and high distortions in said digital video-signal, and changes the operating mode of said apparatus on the basis of an output of said distortion calculating means.

7. An apparatus according to claim 6, wherein said digital video signal is encoded and wherein said distortion calculating means calculates distortion between a restored digital video signal obtained from the encoded digital video signal and said encoded digital video signal.

8. An apparatus according to claim 7, further including, encoding means for encoding said digital video signal in units of a block including a plurality of picture elements of said digital video signal, and wherein said distortion calculating means calculates the distortion between a restored digital video signal obtained by decoding the block-encoded digital video signal in units of said block and the block-encoded digital video signal, and means for collecting results of said calculations of said distortion calculating means for each picture.

9. An apparatus according to claim 6, wherein said mode changeover means determines the operating mode of said apparatus for each picture of said digital video signal.

10. An apparatus according to claim 1, wherein in said first mode, said recording means provides i recording areas for said pilot signal in each of y tracks among x recording tracks, while in said second mode, said recording means provides j recording areas for said pilot signal in each of y tracks among x recording tracks, where i and y are integers, j is an integer larger than i, and x is an integer larger than y.

11. A video information recording apparatus comprising:
   (a) compressing means for compressing digital video information, said compressing means being responsive to a mode changeover signal for changing over the compression rate of the digital video information in units of a picture between at least first and second compression rates, said second compression rate being higher than said first compression rate;

(b) generating means for generating a tracking-control pilot signal;

(c) recording means for recording the digital video information compressed by said compressing means and the pilot signal on a recording medium while forming a number of recording tracks; and (d) mode changeover means for generating said mode changeover signal for changing over an operating mode of said apparatus between a plurality of modes in units of a picture of the digital video information, said plurality of modes including: a first mode in which said compressing means compresses the digital video information at said first compression rate and said recording means provides i recording areas for the pilot signal in each of a predetermined number of tracks among a plurality of recording tracks in which digital video information for one picture is recorded, where i is an integer; and a second mode in which said compressing means compresses the digital information at said second compression rate and said recording means provides j recording areas for the pilot signal in each of a predetermined number of tracks among a plurality of recording tracks in which digital video information for one picture is recorded, where j is a integer larger than i.

12. An apparatus according to claim 11, wherein said mode changeover means generates said mode changeover signal such that said recording means records only one of a plurality of pictures of digital video information in said second mode, and records other pictures in said plurality of pictures of digital video information in said first mode.

13. An apparatus according to claim 11, wherein said mode changeover means generates said mode changeover signal such that said recording means records, in said second mode, a plurality of pictures of digital video information obtained just after the start of recording by said recording means.

14. An apparatus according to claim 13, wherein said mode changeover means generates said mode changeover signal such that, of digital video information except a plurality of pictures of digital video information obtained just after said recording means starts recording, said recording means records only one of a plurality of pictures of the digital video information in said second mode, and records other pictures in said plurality of pictures of digital information in said first mode.

15. An apparatus according to claim 11, wherein said mode changeover means includes distortion calculating means for discriminating between low and high distortions in said digital video information and changes the operating mode of said apparatus on the basis of an output of said distortion calculating means.

* * * * *